United States Patent [19]

Tsuchimoto et al.

[11] Patent Number: 4,546,033
[45] Date of Patent: Oct. 8, 1985

[54] GASKET SHEET

[75] Inventors: Yasushi Tsuchimoto; Shiro Takahata; Kiyotaka Shimada, all of Nara; Koji Tanaka, Okayama; Susumu Aoki, Yokohama; Tsutomu Yamamoto, Yokohama; Masaaki Ashizawa, Yokohama; Kazuo Nishimoto, Yokohama, all of Japan

[73] Assignees: Nichias Corporation, Tokyo; Japan Exlan Company, Ltd., Osaka, both of Japan

[21] Appl. No.: 573,804

[22] Filed: Jan. 25, 1984

Related U.S. Application Data

[62] Division of Ser. No. 359,905, Mar. 19, 1982, abandoned.

[30] Foreign Application Priority Data

Mar. 19, 1981 [JP] Japan .................................. 56-40153
May 26, 1981 [JP] Japan .................................. 56-79762

[51] Int. Cl.4 .......................... C09K 3/10; F16J 15/10
[52] U.S. Cl. ..................................... 428/290; 428/301; 428/443; 428/445; 428/284; 277/DIG. 6; 277/1
[58] Field of Search ............... 428/301, 290, 443, 445; 277/1, DIG. 6; 523/202, 205

[56] References Cited

U.S. PATENT DOCUMENTS 2,381,248  8/1945  Bascom .................... 277/DIG. 6 X
3,686,024  8/1972  Nankee et al. ...................... 428/264
4,295,987  10/1981  Parks .................................. 428/301

FOREIGN PATENT DOCUMENTS 7324814  7/1973  Japan ........................... 277/DIG. 6
459544   1/1937  United Kingdom ......... 277/DIG. 6
0675241  8/1979  U.S.S.R. ...................... 277/DIG. 6

OTHER PUBLICATIONS

Frazier, "Designing for Economical Gasketing" Product Eng., Jul. 1951.

Primary Examiner—George F. Lesmes
Assistant Examiner—Nancy A. B. Swisher
Attorney, Agent, or Firm—Birch, Stewart, Kolasch & Birch

[57] ABSTRACT

A gasket sheet obtained by the milling and vulcanization of 50–85% by weight of a fibrous material, 10–50% by weight of a rubber material and at least 1–23% by weight of a water-insoluble and -swelling substance. The gasket sheet may be a one layer or a three layer sheet.

13 Claims, 1 Drawing Figure

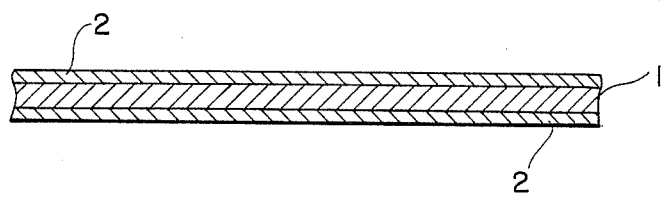

GASKET SHEET

This is a divisional application based upon parent U.S. Ser. No. 359,905—Tsuchimoto et al filed Mar. 19, 1982, now abandoned.

The present invention is concerned with improvements in, or relating to, gasket sheets obtained by the milling and vulcanization of fibrous materials and rubber materials.

Gaskets have been widely used as the sealing material for preventing engine cooling water from leaking through, e.g., the junction of an automotive water pump. These gaskets are obtained by the milling and valcanization of asbestos fibers and rubber materials (generally called compressed asbestos sheets) which have the required heat resistance and durability in mind.

Recently, however, there has been an increasing trend toward reducing the weight of automotive engines. This inevitably requires that the thickness of the flange of the water pump and the diameter of clamp bolts be reduced, that the number of the clamp bolts used be limited, etc. As a result, difficulties are now encountered in the application of sufficient clamping pressures over the compressed asbestos sheet. Such insufficient clamping pressures have an adverse influence on the compatability of the gasket with respect to the associated flange, thus causing a water leakage problem.

As an alternative, paper-made gaskets are used as a replacement for the asbestos sealing gasket. This gasket is softer than the compressed asbestos sheet, and exhibits good initial sealing properties. However, sealing agents, such as oil, which are impregnated in the gasket, dissolve in water with the lapse of time, resulting in deteriorations in the sealing properties.

The present invention provides a solution to the problems existing with the prior art. That is to say, a main object of the present invention is to provide a gasket sheet which takes full advantage of a vulcanized admixture of fibrous materials and rubber materials, and presents no water leakage problem, even at low clamping pressures.

According to the present invention, this object is achieved by the provision of a gasket sheet obtained by incorporating a starting material, composed mainly of 50–85% by weight of fibrous materials and 10–50% by weight of rubber materials, with a water-insoluble and -swelling substance in an amount of 1–23% by weight based on the total weight of said starting material, and milling and vulcanizing the obtained product into a sheet.

This and other objects will be apparent from the following detailed description with reference to an accompanying single drawing, in which:

FIG. 1 is a schematic section showing one preferred embodiment according to the present invention.

The gasket sheet according to the present invention is characterized primarily by a starting material composed mainly of fibers and rubber, to which a water-insoluble and -swelling substance is added. The resultant product is milled and vulcanized into a sheet of any desired shape.

In the starting material, 50 to 85% by weight of fibers are preferably used with 10 to 50% by weight of rubber. The amount of the water-insoluble and -swelling substance used is in a range of 1 to 23% by weight, preferably 2 to 15% by weight, calculated on the weight of the starting material.

When the amount of the fibers used is below 50% by weight, i.e., the amount of the rubber exceeds 50% by weight, the tensile strength and heat resistance of the resultant gasket sheet tend to drop. On the other hand, when the amount of the fibers exceeds 85% by weight, i.e., the amount of the rubber is below 10% by weight, the sealing properties of the resultant gasket sheet deteriorate. This is the reason why the ratio (by weight) of fibers to rubber is limited to the foregoing range.

The fibers which are used as one main component of the starting material include inorganic fibers such as asbestos, glass, carbon, and metal fibers, and/or organic fibers such as phenol and cellulose fibers. These fibers may be used alone or in varying combinations. As for the rubber which is another main component of the starting material, styrene-butadiene rubber (SBR), nitrile-butadiene rubber (NBR), natural rubber (NR) or the like may be used alone or in varying combinations.

The wording "water-insoluble and -swelling substance" is here used to indicate any substance that is insoluble in water and is capable of swelling with water. For the purpose of illustration only, mention is made of natural or synthetic high-molecular substances that are hydrophilic and insoluble in water, and that contain an ionizable group such as carboxyl, sulphonic, phosphoric, quaternary ammonium salt, amino, imino or pyridinium group and/or a nonionic hydrophilic group such as hydroxyl, ether, amide (in chain or cyclic form) or nitrile group. For instance, use may be made of a copolymer of acrylic acid or its salt and divinylbenzene; an alkali hydrolysate of a copolymer or acrylonitrile and vinyl-chloride or vinylidene chloride with one or more ethylenical monomers copolymerizable therewith; a product obtained by cross-linking a polymer with formaldehyde, said polymer being formed by a hydrolysis of acrylonitrile polymer with an alkali; a product obtained by cross-linking an acrylamide copolymer with formaldehyde; an acid condensate of a polyacrylic acid and a polyvinyl alcohol; a product obtained by cross-linking a polyvinyl alcohol with epichlorohydrin; a copolymer of 2-hydroxyethyl methacrylate and ethylene glycol dimethacrylate; a copolymer of 2-methyl-5-vinyl-pyridine and N,N'-methylenebisacryloamide; a copolymer of N,N'-dimethylaminoethyl methacrylate and N,N'-methylenebisacrylamide; a copolymer of N-vinyl-2-pyrrolidone and ethylene glycol dimethacrylate; a cross-linked product of polyoxyethylene by irradiation; a condensate obtained by heating starch in an acidic atmosphere; a saponified product of a graft copolymer of starch/acrylonitrile; a product obtained by drying a saponified product of a copolymer of a vinyl ester and an ethylenically unsaturated carboxylic acid; and the like.

The use of water-soluble and -swelling substances is not preferable, since this type of substance dissolves in water with the lapse of time, resulting in deteriorations in the sealing properties.

In the gasket sheet according to the present invention, the water-swelling substance may be present in the fibrous form or in the granular form. Preferably, the granular water-swelling substance is mixed with the fibrous one.

It is advantageous to use the granular form of the water-swelling substance, rather than the fibrous form, since it is superior in water absorbability and can be more easily and uniformly distributed in the starting material. In addition, the granules of the water-swelling substance tend to migrate from the center to the circumference of the starting material during swelling. Thus, the swollen granules concentrate on the surface portion of the starting material, and play an important role in the prevention of fluid leakages.

However, it is noted that, when the gasket sheet is formed using the granular water-swelling substance, there is a possibility that part of the superficial granules may come in contact with fluids and be entrained therein. To avoid this, the water-swelling substance in the fibrous form may be applied. Since it is entangled with the fibers originally present in the starting material in the course of milling, it remains retained in the starting material even when its swelling takes place.

The water-swelling substance may also be defined in terms of the degree of water swelling, i.e., the ratio of water absorption to its own weight. The more the degree of water swelling, the better the results will be. However, it is preferable that the granular substance has a degree of water swelling of 30–1000, while the fibrous substance has a degree of water swelling of 30–500.

Referring now to the drawing in detail, the present invention includes a three-layer gasket sheet comprising an intermediate layer 1 containing the fibrous water-swelling substance and two outer layers 2 containing the granular water-swelling substance, as shown in FIG. 1. This embodiment of the present invention is designed to take full advantage of both the granular water-swelling substance and the fibrous water-swelling substance, and will be elucidated later.

The present invention also includes a single layer gasket sheet (not shown in the drawing). This single layer is comprised of 50–85% by weight of fibrous material, 10–50% by weight of a rubber material and 1–23% by weight of a water-insoluble and -swelling substance. One especially advantageous combination includes 62% by weight of asbestos fibers, 11% by weight of SBR and natural rubber, 12% by weight of vulcanizers and fillers, and 15% by weight of an acrylic, granular, water-insoluble and -swelling substance. This starting material is milled and vulcanized into a sheet.

The fibrous water-swelling substance has preferably a length of 0.1–10 mm, more particularly 0.2–5 mm. Like the granular substance, the fibrous substance having a length below 0.1 mm tends to be entrained in water. However, the fibrous substance having a length above 10 mm cannot be evenly mixed with the starting material.

The water-swelling substance, if added in too large an amount, leads to a lowering of the tensile strength of the resulting gasket. Depending upon the intended purposes, therefore, the water-swelling substance should preferably be used in an amount of 1–23% by weight (based on the total amount of the starting material).

In general, the gasket sheet according to the present invention may be made by preparing a starting material which is comprised of inorganic fibers, rubber, vulcanizers and fillers, incorporating the given water swelling substance into the starting material, milling the product thus obtained, and vulcanizing the resulting product into a sheet with the aid of calender rolls.

Reference will now be made to the three-layer gasket sheet that is one preferred embodiment of the present invention.

The three-layer gasket sheet may generally be prepared in the following manner. The compositions for the intermediate and outer layers are separately prepared by milling. The mixture for one outer layer is first calender-rolled to form one outer layer on which the intermediate layer is provided. The other outer layer is finally formed on the intermediate layer, and the whole is vulcanized into a sheet of desired shape.

When preparing the intermediate layer composition, the fibrous water-insoluble and -swelling substance is preferably added in an amount of 1–23% by weight based on the total amount of the starting material. To add the water-swelling substance in too large an amount is not preferable since this causes a lowering of the tensile strength of the resultant gasket. The water-swelling substance has preferably a length of 0.1–10 mm, more particularly 0.2–5 mm. As previously stated, the water-swelling substance tends to be entrained in water at a length below 0.1 mm, so that it cannot be evenly mixed in the starting material.

When preparing the composition for the outer layers, the granular water-insoluble and -swelling substance should preferably be used in an amount of 1–38% by weight based on the total weight of the starting material. The granular substance is not critical with respect to its shape, and may be of, e.g., needle-like or flaky shape.

One particular composition, which has been found to be advantageous, comprises an intermediate layer obtained by incorporating into a starting material consisting of 62% by weight of asbestos fibers, 11% by weight of SBR and natural rubber, and 12% by weight of vulcanizers and fillers, an acrylic, fibrous water-insoluble and -swelling substance in an amount of 15% by weight based on the overall weight of said starting material, and two outer layers laminated on both sides of said intermediate layer and each obtained by incorporating into said starting material an acrylic, grannular, water-insoluble and -swelling substance in an amount of 15% by weight, said three layers being vulcanized into a sheet. Another advantageous combination includes an intermediate layer obtained by incorporating into a starting material consisting of 64% by weight of asbestos fibers, 13% by weight of NBR and NR, and 9.5% by weight of vulcanizers and fillers, acrylic, fibrous and granular water-soluble and -swelling substances in an amount of 13.5% by weight based on the total amount of said starting material, and two outer layers laminated on both sides of said intermediate layer and each obtained by incorporating into said starting material a granular water-insoluble and -swelling substance based on starch in an amount of 10% by weight, said three layers being vulcanized into a sheet.

The outer layers provided on both sides of the intermediate layer preferably have a thickness equal to ⅓ or less of the overall thickness of the gasket sheet, but no less than 10 microns. For the outer layer to have a larger thickness is disadvantageous because the granules separate off during swelling, resulting in a lowering of tensile strength. Similarly, for the layer to have a smaller thickness leads to deteriorations in the sealing properties.

Thus, the gasket sheet according to the present invention can be used as an improved seal material for the prevention of fluid leakages, partly because the fibrous water-swelling substance does not separate from the intermediate layer due to its firm adherence thereto, and partly because the granular water-swelling substance makes the surfaces of the outer layers smooth, while the water-swelling particles migrate from center to circumference, absorb water and swell more rapidly. A part of the granular substance which enters the outer layers may separate from the gasket sheet during swelling. However, such separation has little or no influence since the thickness of the outer layers is small as compared with the overall thickness of the gasket sheet.

Therefore, the single- or three-layer gasket sheet prepared according to the present invention shows good water-sealing properties and improved durability.

The present invention will now be explained in detail with reference to the following non-restrictive examples, including comparison examples.

For Examples 1 to 6 inclusive, of a three-layer gasket sheet composition, the starting material comprised asbestos, rubber, vulcanizers, and fillers. This starting material was incorporated with the fibrous, water-insoluble and -swelling substance in the proportions as specified in the Table, to thereby prepare an intermediate layer composition. The said starting material was also incorporated with the granular, water-insoluble and -swelling substance in the proportions as specified in the Table, to thereby obtain two outer layer compositions. These three compositions were separately milled in a mixer for two hours. One of the thus milled outer compositions was calender-rolled to form an outer layer. Subsequently, an intermediate layer was formed on said outer layer by calender-rolling. Finally, another outer layer was formed on said intermediate layer by calender-rolling to obtain a three-layer structure which was then vulcanized into a given gasket sheet. For the physical properties of the thus obtained gasket, see the Table.

The water-swelling substances used here are as follows:

(A) FIBROUS, WATER-INSOLUBLE AND -SWELLING SUBSTANCE

Five parts of AN type fibers (fineness of single fiber; 3 d; length of fiber: 3 mm; intrinsic viscosity of fiber in a dimethylformamide solution at 30° C., 1.3) comprising 90% of acrylonitrile (AN) and 10% of methyl acrylate (MA) were immersed in a 30% aqueous solution of caustic soda, and boiled under agitation for ten minutes. The resulting fibers were washed with water to remove residual alkali therefrom, whereby water-swelling fibers were obtained, having a degree of water swelling of 200 cc/g. An AN type polymer core was found in the fibers.

(B) GRANULAR, WATER-INSOLUBLE AND -SOLUBLE SUBSTANCE

Seventeen parts of an AN type copolymer (molecular weight; intrinsic viscosity=1.5, as measured in a dimethylformamide solution at 30° C.) comprising 90% of acrylonitrile (AN) and 10% of methyl acrylate (MA) were suspended in 83 parts of a 10% aqueous solution of caustic soda, and stirred at 90° C. for 45 minutes to obtain an aqueous polymer solution containing about 70% of acrylic soda and about 30% of acrylamide. Subsequently, the polymer solution was neutralized with an aqueous solution of sulfuric acid. The resulting solution was added with a 30% aqueous solution of formaldehyde in an amount of 30% per 100 parts of said polymer, and stirred at 90° C. for 15 minutes. Thereupon, the resultant product was heated at 200° C. for 60 minutes to obtain a dehydrated and dried mass which was ground to a particle size of 150 microns or less, whereby water-swelling particles were obtained, having a degree of water swelling of 200 cc/g.

For examples 7 to 14 inclusive, of a single-layer gasket sheet composition, the starting material comprised asbestos, rubber, vulcanizers, and fillers. This starting material was incorporated with the above mentioned water-swelling substance. The resultant product was milled in a mixer for two hours, and vulcanized into a sheet with the aid of calender rolls. For the physical properties of the thus formed gasket, see the Table.

For the purpose of comparison, the results of comparison examples are also shown in the Table.

Sealing tests 1 to 4 inclusive were effected as follows:

Sealing Test 1

A gasket under test was clamped between flanges at a pressure of 30 Kg$f$/cm$^2$. Water leakages were examined by applying water pressures of up to 4 Kg$f$/cm$^2$ on the gasket at an incremental rate of 0.5 Kg$f$/cm$^2$.

Sealing Test 2

A gasket under test was clamped between flanges at a pressure of 20 Kg$f$/cm$^2$. Water leakages were examined by applying water pressures of up to 5 Kg$f$/cm$^2$ at an incremental rate of 0.5 Kg$f$/cm$^2$. At the respective pressures, the gasket was maintained for 10 minutes.

Sealing Test 3

A gasket under test was clamped between flanges at a pressure of 30 Kg$f$/cm$^2$. The gasket was then cooled at −30° C. for one hour and then heated 120° C. for one hour, while a water pressure of 2 Kg$f$/cm$^2$ was applied. This cooling/heating cycle was repeated 30 times to examine water leakages.

Sealing Test 4

A gasket under test was clamped between flanges at a pressure of 20 Kg$f$/cm$^2$. Subsequently, the gasket was cooled at −30° C. for one hour and then heated at 120° C. for one hour, while a water pressure of 2 Kg$f$/cm$^2$ was applied. This cooling/heating cycle was repeated 100 times at most to examine water leakages.

As will be appreciated from the results stated in the Table, it is evident that the gaskets according to the present invention exhibit improved sealing properties even at small clamping pressure due to their self-swelling characteristics. Since the water-swelling substance swells upon coming in contact with water, the gasket expands in volume in its entirety. Spaces or gaps between the gasket and the relative flanges and among the fibers in the gasket are thereby eliminated.

In particular, the gaskets containing the fibrous water-swelling substance can maintain their improved swelling effect for extended periods of time. This is because the fibers in the gasket are firmly entangled with the fibrous water-swelling substance, so that the water-swelling substance does not separate from the gasket, even upon swelling.

The present invention is, of course, in no way restricted to the specific disclosure of the specification and drawing, but also encompasses any modifications within the scope of the appended claims.

TABLE

| Example | 1 | | 2 | | 3 | | 4 | | 5 | | 6 | | 7 | 8 | 9 | 10 |
| --- | --- | --- | --- | --- | --- | --- | --- | --- | --- | --- | --- | --- | --- | --- | --- | --- |
| | * | ** | * | ** | * | ** | * | ** | * | ** | * | ** | | | | |
| Asbestos fibers (% by weight) | 61 | 61 | 61 | 61 | 58 | 61 | 63 | 63 | 63 | 63 | 61 | 63 | 67 | 64 | 61 | 62 |

| | | | | | | | | | | | | | | | |
|---|---|---|---|---|---|---|---|---|---|---|---|---|---|---|---|
| Rubber (% by weight) | 15 | 15 | 15 | 15 | 14 | 15 | 11 | 11 | 11 | 11 | 11 | 11 | 16 | 15 | 15 | 15 |
| Vulcanizers plus fillers | 11 | 11 | 11 | 11 | 11 | 11 | 13 | 13 | 13 | 13 | 11 | 13 | 12 | 12 | 11 | 11 |
| Water-swelling Substances Fibrous | 0 (F & G) | 13 (F & G) | 0 (F & G) | 13 (F & G) | 0 (F & G) | 13 (F & G) | 0 (F & G) | 13 (F & G) | 0 (F & G) | 13 (F & G) | 0 (F & G) | 13 (F & G) | 5 | 9 | 13 | 0 |
| Water-swelling Substances Granular | 13 | 0 | 13 | 0 | 17 | 0 | 13 | 0 | 13 | 0 | 17 | 0 | 0 | 0 | 0 | 12 |
| Total | 100 | 100 | 100 | 100 | 100 | 100 | 100 | 100 | 100 | 100 | 100 | 100 | 100 | 100 | 100 | 100 |
| Thickness of one outer layer (mm) | 0.1 | | 0.05 | | 0.05 | | 0.01 | | 0.05 | | 0.05 | | — | — | — | — |
| Thickness of sheet (mm) | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Bulk density | 1.50 | 1.55 | | 1.52 | | 1.50 | | 1.52 | | 1.54 | | | 1.60 | 1.50 | 1.41 | 1.59 |
| Increase in thickness 24 hours after immerse in water (%) | 69 | 65 | | 68 | | 69 | | 72 | | 74 | | | 28 | 39 | 58 | 100 |
| Decrease in weight 5 hours after boiling in distilled water (%) | 3 | 3 | 3 | 3 | 3 | 3 | | | | | | | 2 | 2 | 2 | 6 |
| Sealing test 1 | No leakage | " | " | " | " | " | | | | | | | Leakage occur 1.0 kgf/cm² | Leakage occur 2.0 kgf/cm² | Leakage occur 3.0 kgf/cm² | No Leakage |
| Sealing test 2 | No leakage | " | " | " | " | " | | | | | | | Leakage occurs from the outset | Leakage occur 2.0 kgf/cm² | Leakage occurs 20 cycles | Leakage occur 60 cycles |
| Sealing test 3 | No leakage | " | " | " | " | " | | | | | | | Leakage occurs from the outset | Leakage occur 2.0 kgf/cm² | Leakage occurs 20 cycles | Leakage occur 60 cycles |
| Sealing test 4 | No leakage | " | " | " | " | " | | | | | | | Leakage occurs from the outset | Leakage occur 2.0 kgf/cm² | Leakage occurs 20 cycles | Leakage occur 60 cycles |

| Example | 11 | 12 | 13 | 14 | (Note 1) 15 * | 15 ** | (Note 2) 16 | (Note 3) 17 * | 17 ** | Comp. Example |
|---|---|---|---|---|---|---|---|---|---|---|
| Asbestos fibers (% by weight) | 70 | 66 | 63 | 65 | 62 | 62 | 62 | 62 | 64 | 73 |
| Rubber (% by weight) | 12 | 12 | 11 | 12 | 11 | 11 | 11 | 13 | 13 | 13 |
| Vulcanizers plus fillers | 13 | 13 | 13 | 11 | 12 | 12 | 12 | 15 | 9.5 | 14 |
| Water-swelling Substances Fibrous | 5 | 9 | 13 | 0 | 0 | 15 | 0 | 0 | 7.5 (F & G) | 0 |
| Water-swelling Substances Granular | 0 | 0 | 0 | 12 | 15 | 0 | 15 | 10 | 6 | 0 |
| Total | 100 | 100 | 100 | 100 | 100 | 100 | 100 | 100 | 100 | 100 |
| Thickness of one outer layer (mm) | — | — | — | — | 0.05 | — | | 0.05 | — | — |
| Thickness of sheet (mm) | 0.5 | 0.5 | 0.5 | 0.5 | 0.5 | 0.5 | | 0.5 | 0.5 | 0.5 |
| Bulk density | 1.58 | 1.57 | 1.53 | 1.60 | 1.55 | 1.58 | | 1.54 | | 1.78 |
| Increase in thickness 24 hours after immerse in water (%) | 30 | 43 | 62 | 110 | 72 | 120 | | 70 | | 2 |
| Decrease in weight 5 hours after boiling in distilled water (%) | 2 | 2 | 2 | 6 | 3 | 6 | | 3 | | 1 |
| Sealing test 1 | Leakage occur 1.5 kgf/cm² | Leakage occur 2.5 kgf/cm² | Leakage occur 3.5 kgf/cm² | No leakage | " | " | | " | | Leakage occur from the outset |
| Sealing test 2 | Leakage occur from the outset | Leakage occur 3 cycles | Leakage occur 30 cycles | Leakage occur 54 cycles | No leakage | Leakage occur 60 cycles | | No leakage | | Leakage occur from the outset |
| Sealing test 3 | Leakage occur from the outset | Leakage occur 3 cycles | Leakage occur 30 cycles | Leakage occur 54 cycles | No leakage | Leakage occur 60 cycles | | No leakage | | Leakage occur 0.5 kgf/cm² |
| Sealing test 4 | Leakage occur from | Leakage occur | Leakage occur | Leakage occur | No leakage | Leakage occur | | No leakage | | Leakage occur from |

| | the outset | 3 cycles | 30 cycles | 54 cycles | 60 cycles | the outset |
|---|---|---|---|---|---|---|

*Outer Layer
**Intermediate Layer
(F & G) = Fibrous & Granular
(Note 1): Rubber - SBR and Natural Rubber Water-Swelling Substances -Acryl based
(Note 2): Rubber - SBR and Natural Rubber Water-Swelling Substances - Acryl based
(Note 3): Rubber - NBR and NR Water-Swelling Substances - Acryl based both in the granular and fibrous forms.

What is claimed is:

1. A molded and vulcanized three-layer gasket sheet comprising an intermediate layer and an outer layer laminated on each side of said intermediate layer,
    said intermediate layer comprising 50–85% by weight of a fibrous material selected from the group consisting of asbestos, glass, carbon, phenol and cellulose fibers, 10–50% by weight of a rubber material selected from the group consisting of styrene butadiene rubber, nitrile-butadiene rubber and natural rubber and 1–23% by weight of a water-insoluble and -swelling substance, and
    said outer layers comprising 50–85% by weight of a fibrous material selected from the group consisting of asbestos, glass, carbon, phenol and cellulose fibers, 10–50% by weight of a rubber material selected from the group consisting of styrene butadiene rubber, nitrile-butadiene rubber and natural rubber and 1–38% by weight of a water-insoluble and -swelling material.

2. A gasket sheet according to claim 1, in which said water-insoluble and -swelling substance is in the form selected from the group of forms consisting of fibrous, granular, and a combination of fibers and granular forms.

3. A gasket sheet according to claim 2, in which said fibrous water-swelling substance has a length of 0.1–10 mm.

4. A gasket sheet according to claim 1, in which said water-insoluble and -swelling substance is selected from the group consisting of natural high-molecular substances and synthetic high-molecular substances both of which are hydrophilic and insoluble in water and that contain an ionizable group and/or a nonionic group.

5. A gasket sheet according to claim 4, in which said ionizable group includes carboxyl, sulphonic, and amino groups.

6. A three-layer gasket sheet according to claim 1, in which said intermediate layer comprises 62% by weight of asbestos fibers, 11% by weight of SBR and natural rubber, 12% by weight of vulcanizers and fillers, and 15% by weight of an acrylic, fibrous water-insoluble and -swelling substance,
    and in which said outer layers comprise 62% by weight of asbestos fibers, 11% by weight of SBR and natural rubber, 12% by weight of vulcanizers and fillers, and 15% by weight of an acrylic, granular, water-insoluble and -swelling substance.

7. A three-layer gasket sheet according to claim 1, in which said intermediate layer comprises 64% by weight of asbestos fibers, 13% by weight of NBR and NR, 9.5% by weight of vulcanizers and fillers, and 13.5% by weight of acrylic, fibrous water-insoluble and -swelling substances,
    and in which said outer layers comprise 64% by weight of asbestos fibers, 13% by weight of NBR and NR, 13% by weight of vulcanizers and fillers, and 10% by weight of a starch-based granular water-insoluble and -swelling substance.

8. A three-layer gasket sheet according to claim 1, in which said intermediate layer comprises 62% by weight of asbestos fibers, 13% by weight of NBR and NR, 10% by weight of vulcanizers and fillers, and 15% by weight of acrylic, fibrous water-insoluble and -swelling substances,
    and in which said outer layers comprise 61% by weight of asbestos fibers, 13% by weight of NBR and NR, 16% by weight of vulcanizers and fillers, and 10% by weight of a starch-based granular water-insoluble and -swelling substance.

9. A molded and vulcanized three-layer gasket sheet comprising an intermediate layer and an outer layer laminated on each side of said intermediate layer,
    said intermediate layer comprising 50–85% by weight of a fibrous material selected from the group consisting of asbestos, glass, carbon, phenol and cellulose fibers, 10–50% by weight of a rubber material selected from the group consisting of styrene butadiene rubber, nitrile-butadiene rubber and natural rubber and 1–23% by weight of a fibrous water-insoluble and -swelling substance, and
    said outer layers comprising 50–85% by weight of a fibrous material selected from the group consisting of asbestos, glass, carbon, phenol and cellulose fibers, 10–50% by weight of a rubber material selected from the group consisting of styrene butadiene rubber, nitrile-butadiene rubber and natural rubber and 1–38% by weight of a granular, water-insoluble and -swelling material.

10. A three-layer gasket sheet according to claim 9, in which said intermediate layer comprises 62% by weight of asbestos fibers, 11% by weight of SBR and natural rubber, 12% by weight of vulcanizers and fillers, and 15% by weight of an acrylic, fibrous water-insoluble and -swelling substance,
    and in which said outer layers comprise 62% by weight of asbestos fibers, 11% by weight of SBR and natural rubber, 12% by weight of vulcanizers and fillers, and 15% by weight of an acrylic, granular, water-insoluble and -swelling substance.

11. A three-layer gasket sheet according to claim 9, in which said intermediate layer comprises 64% by weight of asbestos fibers, 13% by weight of NBR and NR, 9.5% by weight of vulcanizers and fillers, and 13.5% by weight of acrylic, fibrous water-insoluble and -swelling substances,
    and in which said outer layers comprise 64% by weight of asbestos fibers, 13% by weight of NBR and NR, 9.5% by weight of vulcanizers and fillers, and 10% by weight of a starch-based granular water-insoluble and -swelling substance.

12. A three-layer gasket sheet according to claim 9, wherein said fibrous water-insoluble and -swelling substance has a degree of water swelling of 30 to 50 and said granular water-insoluble and -swelling substance has a degree of water swelling of 30 to 1,000.

13. A molded and vulcanized three-layer gasket sheet comprising an intermediate layer and an outer layer laminated on each side of said intermediate layer, said intermediate layer comprising 60-66% by weight of a fibrous material selected from the group consisting of asbestos, glass, carbon, phenol and cellulose fibers, 10-15% by weight of a rubber material selected from the group consisting of styrene butadiene rubber, nitrile-butadiene rubber and natural rubber, 4-28% by weight of filler or vulcanizers and 2-15% by weight of a water-insoluble and -swelling substance, and said outer layers comprising 60-66% by weight of a fibrous material selected from the group consisting of asbestos, glass, carbon, phenol and cellulose fibers, 10-15% by weight of a rubber material selected from the group consisting of styrene butadiene rubber, nitrile-butadiene rubber and natural rubber, 4-28% by weight of filler or vulcanizers and 2-15% by weight of a granular, water-insoluble and -swelling material.

* * * * *